Oct. 24, 1933.  W. G. KIRCHHOFF  1,931,614
DOUGH WORKING APPARATUS
Filed Dec. 31, 1931  3 Sheets-Sheet 1

Inventor
William G. Kirchhoff
By Murray & Zugelter
Attorneys

Oct. 24, 1933.　　W. G. KIRCHHOFF　　1,931,614
DOUGH WORKING APPARATUS
Filed Dec. 31, 1931　　3 Sheets-Sheet 3

INVENTOR
William G. Kirchhoff
BY Murray and Zugelter
ATTORNEYS

Patented Oct. 24, 1933

1,931,614

UNITED STATES PATENT OFFICE 1,931,614

DOUGH WORKING APPARATUS

William G. Kirchhoff, Cincinnati, Ohio, assignor to The J. H. Day Company, Cincinnati, Ohio, a corporation of Ohio Application December 31, 1931
Serial No. 584,059

4 Claims. (Cl. 107—12)

This invention relates to dough working apparatus and particularly to means for sheeting the dough prior to the curling or loaf forming operation.

An object of the invention is to provide a novel conveniently attachable auxiliary sheeting means whereby the capacity of a standard dough sheeter may be increased, when desired, without necessitating partial dismantling of the standard machine.

Another object is to provide a novel combination of conveniently attachable auxiliary sheeting device and standard dough sheeter, whereby the height of the apparatus is not undesirably and materially increased, thereby rendering the machine usable with hoppers and other bakery equipment originally built for cooperation with the standard sheeter.

More specifically, an object of the invention is to provide a conveniently attachable means for conditioning large masses of dough so that a standard sheeter of limited capacity may be rendered capable of handling such larger masses.

These and other objects are attained by the means described herein and disclosed in the accompanying drawings, in which.

Figure 1:
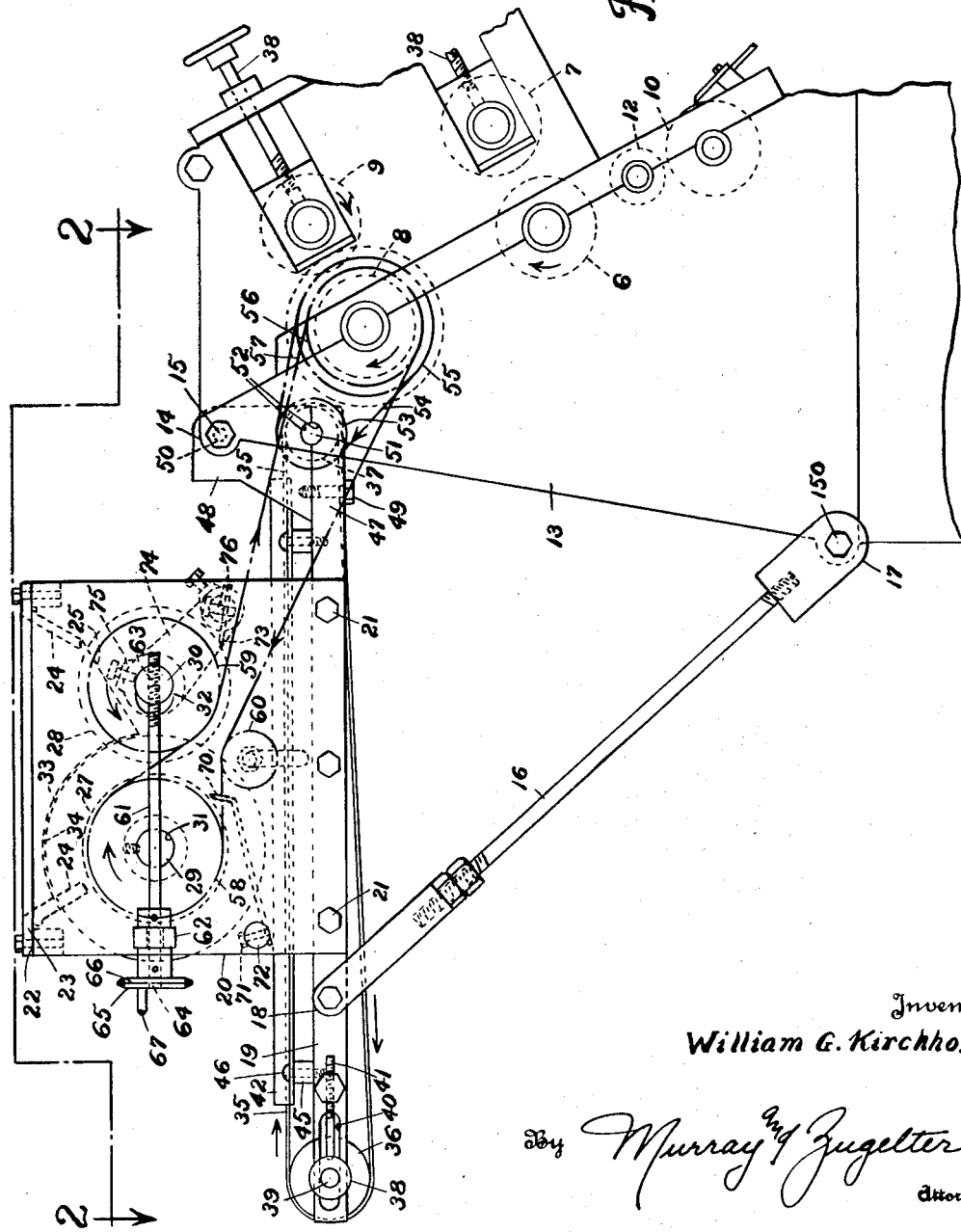
Fig. 1 is a side elevational view showing the combination of standard sheeter and auxiliary sheeter, part of the standard sheeter being broken away.

The means of this invention is adapted for attachment to machines of the general character disclosed in the co-pending patent application of William G. Kirchhoff, Serial Number 537,255, filed May 14, 1931, wherein 6, 7, 8 and 9 indicate the dough sheeting rolls of a standard sheeting and curling machine, said rolls being arranged in pairs, those indicated at 6 and 7 being disposed below the pair of rolls 8—9. As in the aforesaid, previously filed patent application, the rolls may be adjusted relative to one another by suitable adjusting means 38. The characters 12 and 10 indicate the pilot roller and the curling roller, respectively, which correspond to the pilot roller and curling roller in the above noted Kirchhoff application and the means for power actuating the various rollers are indicated clearly therein.

The standard sheeter and curling apparatus briefly described above is capable of efficiently handling all normal sizes of dough masses to be formed into loaves, but it is found that when unusually large masses of dough are fed to the standard machine, some difficulty is encountered in causing the sheeter rolls to properly receive and operate upon the unusually large dough mass. One of the chief objects of this invention is to provide a novel and conveniently attachable means in the form of an auxiliary sheeter, which will properly condition the unusually large mass of dough for reception by the sheeting rolls of a standard sheeting and curling machine. The auxiliary sheeting device, about to be described, may conveniently be attached to the standard machine without unduly increasing the height thereof, so that the machine may be used in conjunction with hoppers and other standard equipment in a bakery, which equipment was originally installed for cooperation with the standard sheeting and curling machine.

The standard machine comprises a pair of spaced side members 13 between which are disposed the sheeting rolls and certain other rolls such as 10 and 12. At the tops of the members 13 are the perforated ears 14 which may receive the bolts 15 that are employed for holding the auxiliary sheeter device in position relative to the supports 13. An additional supporting means for the auxiliary device is indicated at 16, and this means may be a pair of longitudinally adjustable rods having their lower ends 17 bolted to the members 13 while the upper ends 18 thereof are secured to the auxiliary sheeting device.

Figure 2:
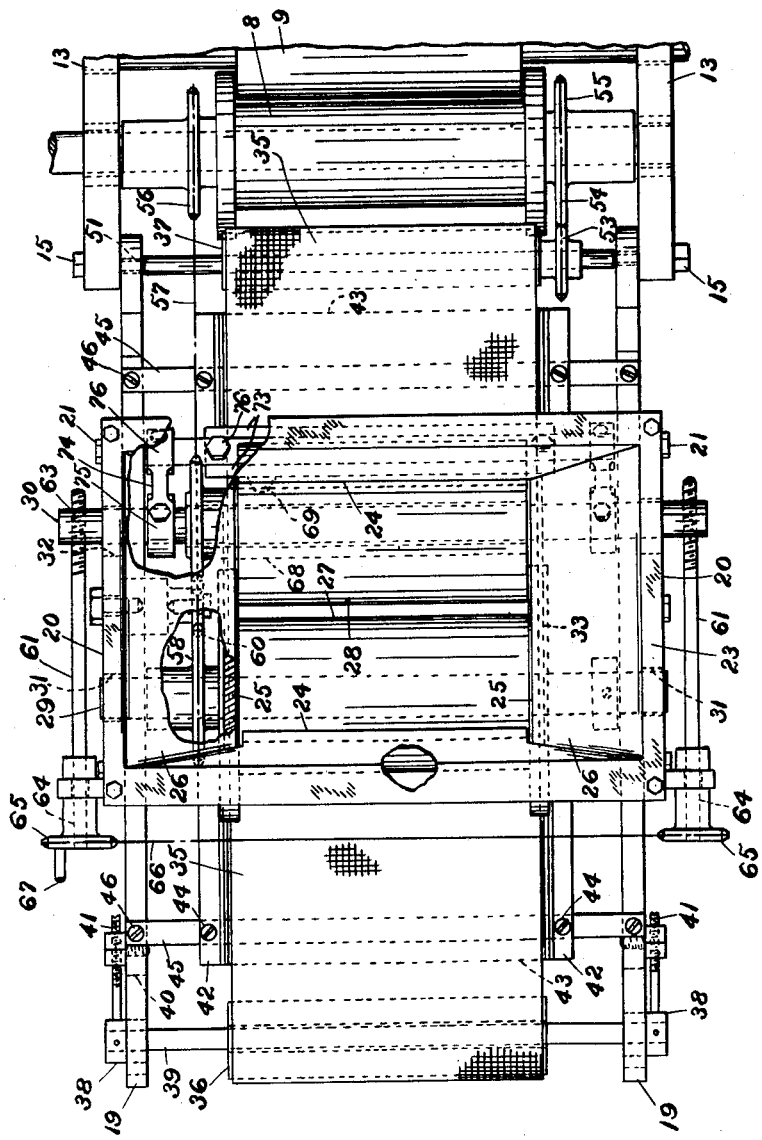
Fig. 2 is a top plan view taken on line 2—2 of Fig. 1, parts being broken away.
Figure 3:
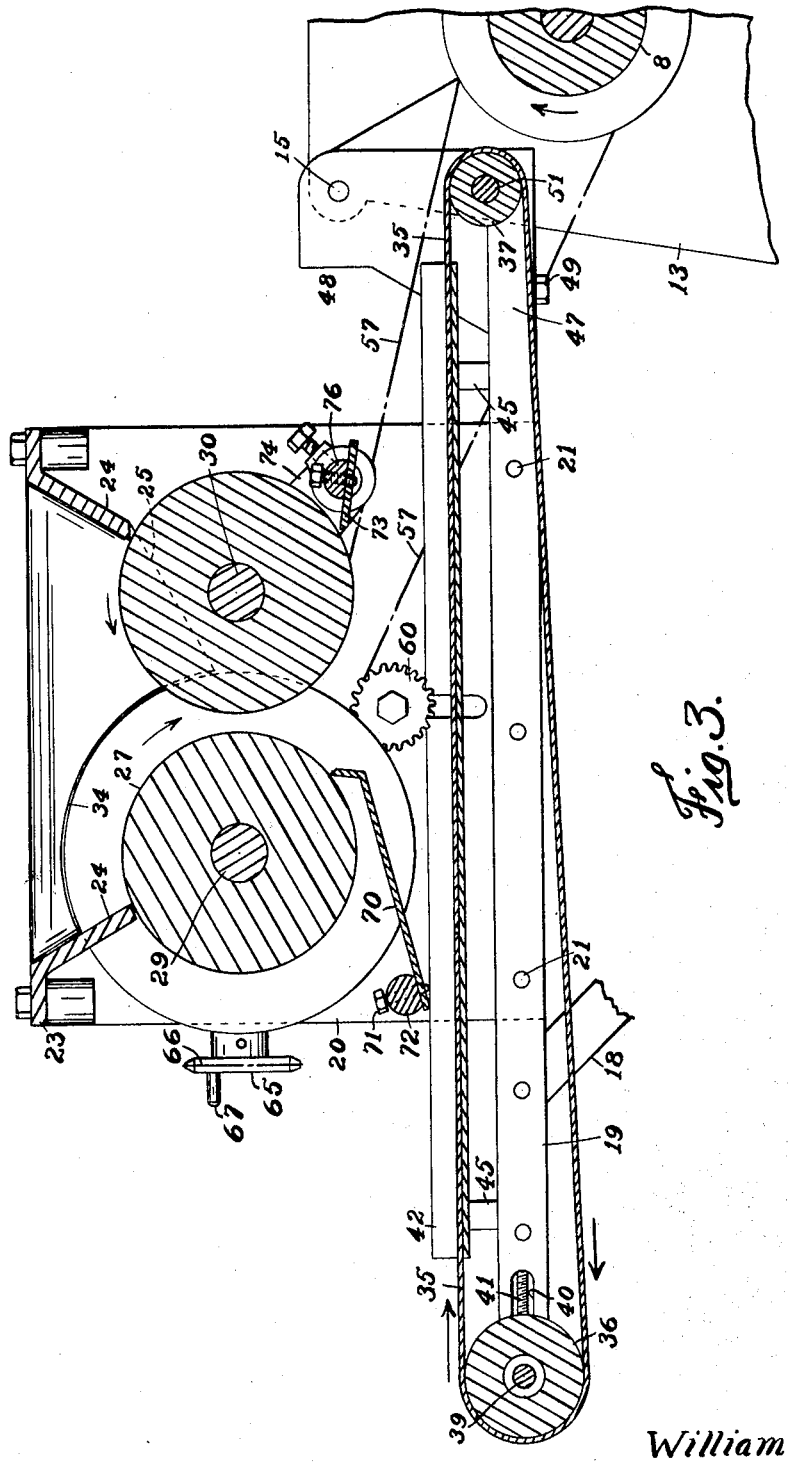
Fig. 3 is a longitudinal cross sectional view of the auxiliary sheeting device.

The auxiliary sheeting device includes a frame comprising a pair of auxiliary spaced bar members 19, each of which has fixed thereto an upright plate or housing member 20, and between which plates is disposed the mechanism of the auxiliary sheeter. The plates may be secured to the horizontal bar members by any suitable means such as the bolts 21. Connecting the top edges 22 of the plates 20 is a hopper member 23 which includes the opposed convergent end walls 24 and the opposed substantially vertical side walls 25. The uppermost portions of the walls 25 are flared upwardly and outwardly as indicated at 26 in Fig. 2. Below the hopper 24—25 the auxiliary sheeter rolls 27 and 28 are supported upon suitable shafts 29 and 30, respectively, which shafts are supported in suitable bearings 31 and 32. Sheeter roll 27 is provided with a pair of spaced flanges 33 between which the cylindrical roll 28 is snugly received so that its ends may move in close proximity with the spaced flanges of roll 27. The substantially vertical walls 25 of the hopper are made with a curvature at 34 so that they may fit closely about a portion of the peripheries of the flanges 33. Said vertical wall portions also fit snugly alongside the ends of the plain sheeter roll 28, as indicated at 25 of Fig. 1. From the foregoing it should be apparent that the hopper is so shaped in every respect, that masses of dough placed therein will be directed onto the operative surfaces of the auxiliary sheeting rolls.

Beneath the auxiliary sheeting rolls is arranged a conveyor belt 35 which moves in the direction indicated by the arrow, and which serves to convey to the sheeting rolls 8 and 9 of the standard machine the plastic material sheeted initially between the rolls of the auxiliary sheeting device. Said conveyor belt 35 is disposed about the conveyor supporting rollers 36 and 37 which are located at opposite ends of the frame members 19. The conveyor belt supporting roller 36 may be made adjustable for tightening or loosening the conveyor belt 35, if desired. The adjusting means may conveniently comprise a pair of opposed bearing members 38 which support the ends of a shaft 39 of roll 36, and which bearing members may be moved forward or back within the elongated slots 40 formed in the frame members 19. The bearing members may be moved within their respective slots 40 by means of the adjusting screws indicated at 41.

The uppermost run of the conveyor belt 35 is supported upon and guided between a pair of L-shaped spaced parallel guides 42 between which is supported a suitable pressure plate 43 that provides a rigid support over which the upper run of the conveyor belt may move. The pressure board and the guides may be screwed or otherwise suitably fastened, as at 44, to two or more transversely disposed spacing bars 45 which may be secured, as at 46, to the opposed frame members 19. From the foregoing it should readily be apparent that material made into sheets between the auxiliary sheeting rolls 27 and 28, will be carried to the main sheeting rolls 8 and 9 of the standard sheeter and curling machine 13.

It is found that when an unusually large mass of material is presented to the sheeting rolls of the standard machine in the form of sheets instead of lumps, the plastic material is readily received and operated upon by the sheeting rolls 8 and 9 of the standard machine although said rolls originally were capable of properly handling only a much smaller quantity of material.

The means for conveniently attaching the forward ends 47 of the auxiliary sheeting device to the members 13 comprise a pair of upwardly extending brackets 48 fixed to the members 19 by any suitable means such as bolts 49, said brackets having formed therein adjacent their top edges a pair of aligned perforations 50 adapted to receive the bolts 15. The brackets are adapted to be disposed between the members 13 and preferably in abutment upon the inner surfaces thereof. The shaft 51 upon which the conveyor roll 37 is mounted, may be journalled in suitable half bearings 52 formed in the ends 47 of members 19 and in the lower portions of the brackets 48. The shaft 51 has fixedly mounted thereon a sprocket 53 for cooperation with a chain 54 that engages a sprocket 55 fixed for rotation with the roll 8. The conveyor thereby is driven by power taken from the roll 8. A second sprocket 56, that is fixed for rotation with sheeter roll 8, has in engagement therewith a chain 57 that engages sprockets 58 and 59 which are fixed for rotation with the rolls 27 and 28, respectively. The chain may engage also an idler sprocket 60 suitably mounted for rotation upon the frame of the auxiliary sheeter.

Any suitable means may be provided for varying the space between the operative sheeting surfaces of the rolls 27 and 28. The means illustrated herein comprises a pair of threaded rods 61 rotatably mounted in suitable bearings 62 carried by the frame of the auxiliary sheeter, which threaded rods engage threaded bores 63 formed in the opposite end portions of the shaft 30. The outermost ends 64 of said rods may carry sprockets 65 connected to one another by means of a chain 66 whereby the rods may be rotated in unison upon actuation of a handle member 67 carried by one of the sprockets. It is to be noted that the sheeter roll 28 rotates relative to the shaft 30, which shaft is precluded from rotation by the rods 61. In order to provide for rotation of the sprocket 59 with the sheeter roll 28, the sprocket and the sheeter roll may be fixed to a sleeve 68 by any suitable means such as a key 69, the sleeve being rotatably mounted upon the shaft 30.

Means are provided for scraping the sheeter rolls 27 and 28. The means for scraping roll 27 may comprise a resilient blade 70 suitably secured at 71 to a transverse member 72 having its opposite ends fixed relative to the plates or side members 20. The means for supporting the blade 73 which scrapes the roll 28, may comprise a pair of downwardly extending arms 74 having their upper ends 75 fixed to the non-rotating shaft 30, and the lower ends of which arms carry any suitable type of blade clamping means 76 which need not be described in detail, as their specific construction is unimportant.

In using the device, the unusually large masses of dough to be operated upon are dropped successively into the hopper 23 and are thereby directed to the auxiliary sheeting rolls 27 and 28 which flatten the mass and direct it onto the moving conveyor belt 35. The conveyor belt directs the flattened mass to the initial sheeting rolls 8 and 9 of the standard machine 13, which rolls 8 and 9 pass the flattened mass onto the rolls 6 and 7 which finish the sheeting operation. Thereafter the perfectly flattened mass is subjected to the action of the curling means 10—12 just as a normal sized quantity of dough would be operated upon by said curling means. By means of the device of the invention, the standard machine 13 may be operated at substantially the same speed and with the same efficiency of operation secured in the handling of normal sized dough masses. The auxiliary sheeter mechanism may readily be attached and detached with respect to the standard machine by simply removing the bolts 15 and 150, and disconnecting the chains 54 and 57. After removal of the auxiliary sheeting device the standard machine may be used for operating upon normal sized loaves as was originally intended, or, the auxiliary device may remain in position:

It is to be understood that various modifications and changes in structural details of the device may be made, within the scope of the appended claims without departing from the spirit of the invention.

What is claimed is:

1. The combination with a dough sheeter and curling machine having power operated sheeter rolls adapted to operate only on dough masses of limited size, of detachable means for rendering said machine selectively capable of effectively operating upon unusually large masses of dough said means comprising an auxiliary sheeting device constituted of a substantially horizontal frame having opposite ends one of which ends is secured to the dough sheeter and curling machine adjacent to its power operated sheeter rolls, auxiliary sheeting means located intermediate the frame ends at a sufficient distance from said one of said frame ends to expose the power operated sheeter rolls, of the sheeter and curling machine, for reception of dough masses dropped from a point directly above them, a conveyor for advancing to the sheeter rolls of the dough sheeter and curling machine the masses of dough operated upon by the auxiliary sheeting means, and means for power actuating the auxiliary sheeting means and the conveyor, said auxiliary sheeting device being offset laterally of the sheeter and curling machine to increase the length rather than the height of the sheeter and curling machine while the auxiliary sheeting device is secured in position.

2. The combination with a dough sheeter and curling machine having power operated sheeter rolls adapted to operate only upon dough masses of limited size, of detachable means for rendering said machine selectively capable of effectively operating upon unusually large masses of dough, said means comprising an auxiliary sheeting device constituted of a substantially horizontal frame having opposite ends, one of which ends is secured to the dough sheeter and curling machine adjacent to its power operated sheeting rolls, auxiliary sheeting means located intermediate the frame ends at a sufficient distance from said one of said frame ends to expose the power actuated sheeter rolls, of the aforesaid sheeter and curling machine, for reception of dough masses dropped from a point directly above them, a conveyor extending substantially horizontally from the auxiliary sheeting means to a point substantially level with the aforesaid power operated sheeter rolls, of the dough sheeter and curling machine, for advancing to said sheeter rolls the masses of dough operated upon by the auxiliary sheeting means, and means for power actuating the auxiliary sheeting means and the conveyor, said auxiliary sheeting device being offset laterally of the sheeter and curling machine to increase the length rather than the height of the sheeter and curling machine when the auxiliary sheeting device is secured in position.

3. An auxiliary device adapted for attachment to dough sheeter and curling machines to render such machines effective for operating upon masses of dough larger than can normally be handled effectively by the sheeter and curling machine, said auxiliary device comprising a pair of longitudinal frame members having opposite ends, a conveyor roller at each end disposed transversely of the frame members, an endless conveyor belt supported by the rollers in a substantially horizontal position, a pressure board intermediate the conveyor rollers and supported on the frame in a position below the upper run of the conveyor belt, guide means for maintaining the belt in position upon the conveyor roller, bracket means at one end of the frame, means associated with the bracket means for attachment of one end of the frame to the sheeter and curling machine substantially laterally of the machine rather than above so as to preclude adding materially to the height of the sheeter and curling machine, a complete sheeting means having all of its parts disposed above the upper run of the conveyor belt and rearwardly of said bracket means a sufficient distance to expose the sheeter and curling machine rolls for reception of dough masses dropped from a point directly above them, and so that masses of dough sheeted by the auxiliary sheeter may drop onto the conveyor belt, and power transmission mechanism for moving the upper run of the conveyor belt in the direction of that end of the frame which supports the bracket means.

4. An auxiliary device adapted for attachment to dough sheeter and curling machines to render such machines effective for operating upon masses of dough larger than can normally be handled effectively by the sheeter and curling machine, said auxiliary device comprising a longitudinal frame having opposite ends, a conveyor roller at each end disposed transversely of the frame, an endless conveyor belt supported by the rollers in a substantially horizontal position, bracket means for connecting the frame to the sheeter and curling machine in an offset position substantially laterally of the machine rather than above it, so as to preclude adding materially to the height of the sheeter and curling machine, a complete sheeting means having all of its parts disposed above the upper run of the conveyor belt and rearwardly of said bracket means for a distance sufficient to expose the sheeter and curling machine rolls for reception of dough masses dropped from a point directly above them, and so that masses of dough sheeted by the auxiliary sheeter rolls may drop onto the conveyor belt, and power transmission mechanism for moving the upper run of the conveyor belt in the direction of the sheeter and curling machine rolls.

WILLIAM G. KIRCHHOFF.